Patented May 18, 1954

2,678,871

UNITED STATES PATENT OFFICE 2,678,871

PRODUCTION OF AMMONIUM THIOCYANATE

Nelson B. Russell, El Dorado, Ark., assignor to Lion Oil Company, El Dorado, Ark., a corporation of Delaware No Drawing. Application April 20, 1951, Serial No. 222,161

13 Claims. (Cl. 23—75)

This invention relates to a method of preparing ammonium thiocyanate.

By "sulfur" as used herein is meant elemental sulfur. In view of the fact that an aqueous system is used in this invention, by "ammonium sulfide" as used herein is meant aqueous ammonium sulfide. By "elevated pressure" and "elevated temperature" as used herein is meant pressures above atmospheric and temperatures at or above the boiling point (approximately 40° C.) of the reaction mixture defined hereinafter.

It is known that ammonium thiocyanate can be prepared from hydrocyanic acid, ammonia (as such or as ammonium hydroxide), and sulfur, the sulfur being carried in ammonium sulfide. The major drawback to this process as heretofore practiced is that the rate of reaction is not sufficiently rapid to render the process as feasible as desired commercially. A further serious drawback is that the slow rate of reaction produces a colored product, the depth and extent of the color varying directly with reaction time. A colorless product is desired.

An object of this invention is to provide an improved proces of preparing ammonium thiocyanate. A further object is to provide an improved process of preparing ammonium thiocyanate from hydrocyanic acid, ammonia and sulfur. A still further object is to provide a process of preparing substantially colorless ammonium thiocyanate in which the reaction involved is carried out at a rate much greater than heretofore found possible. Further objects will be apparent from the description of this invention given hereinafter.

The above objects are accomplished according to this invention broadly by reacting together hydrocyanic acid, ammonia, and sulfur in the presence of ammonium sulfide in which initially in excess of 4.2% and preferably at least about 20% of the sulfur is dissolved. It is specifically preferred that at least about 60% of the sulfur will be initially dissolved in the ammonium sulfide. In order to prevent loss of the reactants (particularly hydrocyanic acid) and a consequent reduction in yield, preferably the reaction temperature will be held below the boiling point of the reaction mixture, which is about 40° C. Thus preferably the temperature will be held to not exceed about 38° C.

In U. S. Patent 2,293,031, 4.2% is the maximum amount of sulfur shown initially dissolved in the ammonium sulfide.

It has been found according to this invention that the rate of the above reaction varies directly with the per cent of the sulfur initially dissolved in the ammonium sulfide; that as the per cent sulfur initially so dissolved exceeds that of the art (4.2%), the reaction rate shown therein improves; that if at least about 20% of the sulfur is initially so dissolved, the improvement in reaction rate over the art definitely becomes significant; that if at least about 28% of the sulfur is initially so dissolved, a more substantial improvement in reaction rate over the art is obtained; that if at least about 60% of the sulfur is initially so dissolved, the reaction can be carried out substantially instantaneously. Furthermore, almost quantitative yields of ammonium thiocyanate of very high purity are obtained provided the reaction temperature is not permitted to exceed about 38° C. Heretofore several hours were required to complete this reaction.

The following examples illustrate specific embodiments of this invention. For the sake of simplicity, the data from a number of runs are presented in a single example in Table 1 hereinafter. To facilitate handling, aqueous solutions of the hydrocyanic acid and ammonia were employed. The aqueous solution of hydrocyanic acid was prepared from commercial liquid hydrocyanic acid of 97% purity. Other concentrations of hydrocyanic acid and of ammonia up to and including 100% may be used.

EXAMPLE 1

The hydrocyanic acid was added to a mixture of the ammonia and sulfur, the sulfur being carried in the ammonium sulfide. The amount of the sulfur dissolved in the ammonium sulfide was varied from zero to 100% as shown in Table 1. The rate of addition of hydrocyanic acid was as rapid as would permit control of the temperature (the reaction being strongly exothermic) under the circumstances within the ranges given and with water-bath cooling of the reaction mixture. If desired, the reaction can be carried out still more rapidly than shown in the Table 1 below by more rapidly removing the heat from the reaction mixture. After completion of the addition of hydrocyanic acid, the mixture was boiled until free of sulfide. Next the mixture was filtered to remove solids, principally elemental sulfur precipitated because of the slight excess of sulfur used and also from ammonium sulfide oxidation during boiling. The resulting water-clear filtrate contained ammonium thiocyanate of about 30% concentration. The ammonium thiocyanate obtained was essentially pure (98%–99% purity).

Frequently there is no need for reducing the product to solid ammonium thiocyanate because it is used for various applications in solutions of the desired concentrations. However if solid ammonium thiocyanate is desired, this can be readily prepared e. g. by evaporating the solution (filtrate) to a high concentration followed by chilling. Other conventional methods may be used to produce solid ammonium thiocyanate from the solution, e. g. those methods disclosed in U. S. Patent No. 2,293,031. For instance solid ammonium thiocyanate can be obtained by cooling the above hot filtrate to about 20° C. and drying the thus precipitated ammonium thiocyanate.

A summary of the conditions and results obtained in the various runs are given in Table 1, wherein "per cent" and "parts" are by weight and wherein the yield of ammonium thiocyanate is based on 100% theoretical of one mol of ammonium thiocyanate being produced per mol of hydrocyanic acid used.

yields of ammonium thiocyanate because of loss of hydrocyanic acid and ammonia. Of course the pressure is dependent upon the temperature employed and varies directly therewith. The pressure involved is autogenously developed. In addition to requiring pressure equipment, a further disadvantage of using elevated conditions is that a colored product results.

Example 2 below illustrates a specific embodiment of this invention. Except as to elevated temperature and pressure, the conditions are substantially the same as those set forth in Example 1.

EXAMPLE 2

The ammonia, sulfur and ammonium sulfide were placed in a pressure vessel and heated to 90° C. after which the hydrocyanic acid was added. During the reaction time of one hour the reaction temperature varied within the range

*Table 1*

| Run No. | Mol Ratio | | | | Parts S | Parts 40% Aq. $(NH_4)_2S$ | Parts 29% Aq. $NH_3$ | Parts 48% Aq. HCN | Percent of elemental S initially dissolved | Reaction Temperature, °C. | Reaction Time, Min. | Percent Yield $NH_4SCN$ |
|---|---|---|---|---|---|---|---|---|---|---|---|---|
| | $(NH_4)_2S$ | S | $NH_3$ | HCN | | | | | | | | |
| 1 | 0 | 1.04 | 1.16 | 1.0 | 13.4 | 0.0 | 27.6 | 22.74 | 0.0 | 23–27 | 20 | 10.0 |
| 2 | .0133 | 1.01 | 1.16 | 1.0 | 8.5 | 0.6 | 17.9 | 14.6 | 4.2 | 30–35 | 10 | 61.0 |
| 3 | .0134 | 1.01 | 1.16 | 1.0 | 7.0 | 0.5 | 14.73 | 12.17 | 4.2 | 25–35 | 20 hr. | 81.0 |
| 4 | .0279 | 1.06 | 1.16 | 1.0 | 10.7 | 1.5 | 21.5 | 17.77 | 8.1 | 30–35 | 15 | 65.2 |
| 5 | .0622 | 1.01 | 1.15 | 1.0 | 8.8 | 2.9 | 18.5 | 15.17 | 19.3 | 25–33 | 15 | 68.6 |
| 6 | .107 | 1.01 | 1.16 | 1.0 | 8.9 | 4.4 | 18.6 | 15.25 | 28.6 | 30–38 | 15 | 80.5 |
| 7 | .187 | 1.01 | 1.15 | 1.0 | 11.7 | 11.7 | 24.8 | 20.33 | 59.0 | 30–38 | 20 | 95.0 |
| 8 | .686 | 1.03 | 1.15 | 1.0 | 10.0 | 35.5 | 20.6 | 17.07 | 100.0 | 30–33 | 30 | 97.0 |
| 9 | .748 | 1.87 | 2.0 | 1.0 | 8.7 | 18.6 | 17.0 | 8.17 | 100.0 | 25–30 | 30 | 95.4 |

The above data clearly show the important discovery and crux of this invention, namely: that the reaction rate is a function of the per cent sulfur initially dissolved in the ammonium sulfide; that the reaction rate varies directly as the per cent sulfur initially dissolved in the ammonium sulfide; and that the reaction can be carried out substantially instantaneously with sufficient cooling of the reaction mixture. More specifically, these data show that as the per cent sulfur initially dissolved in the ammonium sulfide exceeds that of the art (run 2, 4.2%) the reaction rate shown therein improves; that although an improvement in reaction rate is realized with 8% as compared with 4% of the sulfur initially so dissolved (runs 2 and 4), the improvement is more marked when 20% of the sulfur is initially so dissolved; that the improvement in reaction rate is quite substantial with 28% of the sulfur initially so dissolved, and that if at least about 60% of the sulfur is initially so dissolved, the reaction can be carried out substantially instantaneously.

While it is preferred to practice this invention by carrying out the reaction at a temperature below the boiling point (approximately 40° C.) of the reaction mixture and at atmospheric pressure, it is within the scope of this invention to use elevated temperatures and pressures. If the reaction is carried out under an elevated temperature, it is necessary to use a closed system such as a pressure vessel in order to avoid low 75° C.–90° C. and the pressure varied within the range 50–90 p. s. i.

A summary of the conditions and results obtained are given in Table 2 below, wherein "per cent" and "parts" are by weight and wherein the yield of ammonium thiocyanate is based on 100% theoretical of one mol of ammonium thiocyanate being produced per mol of hydrocyanic acid used.

*Table 2*

| Mol Ratio | | | | Parts S | Parts 40% Aq. $(NH_4)_2S$ | Parts 29% Aq. $NH_3$ | Parts 48% Aq. HCN | Percent of elemental S initially dissolved | Reaction Temperature, °C. | Reaction Time, Min. | Percent Yield $NH_4SCN$ |
|---|---|---|---|---|---|---|---|---|---|---|---|
| $(NH_4)_2S$ | S | $NH_3$ | HCN | | | | | | | | |
| .48 | 1.35 | 1.16 | 1.0 | 27.5 | 52.3 | 43.3 | 35.8 | 100 | 75–90 | 60 | 101.1 |

The yields obtained according to this embodiment are substantially quantitative. The abnormally high yield (101.1%) in this particular example is attributed to experimental error.

Instead of the procedure followed in the foregoing examples, hydrogen cyanide gas can be bubbled into the reaction mixture. Likewise, as a further alternative, the hydrocyanic acid (or the hydrogen cyanide gas) and the ammonia can be added simultaneously but separately to the other constituents of the reaction mixture.

As many apparently widely different embodiments of this invention may be made without departing from the spirit and scope thereof, it is to be understood that the invention is not limited to the specific embodiments thereof except as defined in the appended claims.

What is claimed is:

1. Process of preparing ammonium thiocyanate which comprises reacting together hydrocyanic acid, ammonia and sulfur in the presence of ammonium sulfide, initially at least about 20% of the sulfur being dissolved in the ammonium sulfide.

2. Process of preparing ammonium thiocyanate which comprises reacting together at a temperature not in excess of 38° C. hydrocyanic acid, ammonia and sulfur in the presence of ammonium sulfide, initially at least about 20% of the sulfur being dissolved in the ammonium sulfide.

3. Process of preparing ammonium thiocyanate which comprises reacting together hydrocyanic acid, ammonia and sulfur in the presence of ammonium sulfide, initially about 30%–60% of the sulfur being dissolved in the ammonium sulfide.

4. Process of preparing ammonium thiocyanate which comprises reacting together at a temperature not in excess of 38° C. hydrocyanic acid, ammonia and sulfur in the presence of ammonium sulfide, initially about 30%–60% of the sulfur being dissolved in the ammonium sulfide.

5. Process of preparing ammonium thiocyanate which comprises the steps of adding hydrocyanic acid to a mixture of ammonia, sulfur and ammonium sulfide, the ratio of ammonium sulfide to sulfur being such that initially at least about 20% of the sulfur is dissolved in the ammonium sulfide; heating the resulting mixture until free of sulfide; and finally filtering the resulting mixture.

6. Process of preparing ammonium thiocyanate which comprises the steps of adding hydrocyanic acid to a mixture of ammonia, sulfur and ammonium sulfide, the ratio of ammonium sulfide to sulfur being such that initially about 30%–60% of the sulfur is dissolved in the ammonium sulfide; heating the resulting mixture until free of sulfide; and finally filtering the resulting mixture.

7. Process of preparing ammonium thiocyanate which comprises the steps of adding hydrocyanic acid to a mixture of ammonia, sulfur and ammonium sulfide, the ratio of ammonium sulfide to sulfur being such that initially at least about 20% of the sulfur is dissolved in the ammonium sulfide; heating the resulting mixture until free of sulfide; filtering the resulting mixture; cooling the filtrate to precipitate the ammonium thiocyanate and drying and recovering same.

8. Process of preparing ammonium thiocyanate which comprises the steps of adding hydrocyanic acid to a mixture of ammonia, sulfur and ammonium sulfide while maintaining the temperature of the reaction at not in excess of 38° C., the ratio of ammonium sulfide to sulfur being such that initially at least about 20% of the sulfur is dissolved in the ammonium sulfide; boiling the resulting mixture until free of sulfide; and finally filtering the resulting mixture.

9. Process of preparing ammonium thiocyanate which comprises the steps of adding hydrocyanic acid to a mixture of ammonia, sulfur and ammonium sulfide while maintaining the temperature of the reaction at not in excess of 38° C., the ratio of ammonium sulfide to sulfur being such that initially about 30%–60% of the sulfur is dissolved in the ammonium sulfide; boiling the resulting mixture until free of sulfide; and finally filtering the resulting mixture.

10. Process of preparing ammonium thiocyanate which comprises the steps of adding hydrocyanic acid to a mixture of ammonia, sulfur and ammonium sulfide while maintaining the temperature of the reaction at not in excess of 38° C., the ratio of ammonium sulfide to sulfur being such that initially about 30%–60% of the sulfur is dissolved in the ammonium sulfide; boiling the resulting mixture until free of sulfide; filtering the resulting mixture; cooling the filtrate to precipitate the ammonium thiocyanate and drying and recovering same.

11. Process of preparing ammonium thiocyanate which comprises the steps of adding hydrocyanic acid to a mixture under elevated temperature and pressure of ammonia, sulfur and ammonium sulfide, the ratio of ammonium sulfide to sulfur being such that initially at least about 20% of the sulfur is dissolved in the ammonium sulfide; heating the resulting mixture under atmospheric pressure until free of sulfide; and finally filtering the mixture.

12. Process of preparing ammonium thiocyanate which comprises the steps of adding hydrocyanic acid to a mixture under elevated temperature and pressure of ammonia, sulfur and ammonium sulfide, the ratio of ammonium sulfide to sulfur being such that initially about 30%–60% of the sulfur is dissolved in the ammonium sulfide; heating the resulting mixture under atmospheric pressure until free of sulfide and finally filtering the mixture.

13. Process of preparing ammonium thiocyanate which comprises the steps of adding hydrocyanic acid to a mixture under elevated temperature and pressure of ammonia, sulfur and ammonium sulfide, the ratio of ammonium sulfide to sulfur being such that initially at least about 20% of the sulfur is dissolved in the ammonium sulfide; boiling the resulting mixture under atmospheric pressure until free of sulfide; filtering the resulting mixture; cooling the filtrate to precipitate ammonium thiocyanate and drying and recovering same.

References Cited in the file of this patent

UNITED STATES PATENTS

| Number | Name | Date |
|---|---|---|
| 705,152 | Smith et al. | July 22, 1902 |
| 922,564 | Chance | May 25, 1909 |
| 1,924,206 | Hansen | Aug. 29, 1933 |
| 2,194,438 | Wernlund | Mar. 19, 1940 |
| 2,286,273 | Hill | June 16, 1942 |
| 2,293,031 | Foster et al. | Aug. 18, 1942 |
| 2,372,119 | Riethof | Mar. 20, 1945 |